US012667507B1

(12) United States Patent
Liang

(10) Patent No.: US 12,667,507 B1
(45) Date of Patent: Jun. 30, 2026

(54) ADJUSTABLE BEDSIDE ASSIST DEVICE

(71) Applicant: Zhongshan KDB Health Solutions Co., Ltd., Zhongshan City (CN)

(72) Inventor: Junjie Liang, Zhongshan City (CN)

(73) Assignee: Zhongshan KDB Health Solutions Co., Ltd., Zhongshan City (CN)

( * ) Notice: Subject to any disclaimer, the term of this patent is extended or adjusted under 35 U.S.C. 154(b) by 0 days.

(21) Appl. No.: 19/432,288

(22) Filed: Dec. 24, 2025

(51) Int. Cl.
*A61G 7/10* (2006.01)
*A61G 7/053* (2006.01)

(52) U.S. Cl.
CPC ........... *A61G 7/1038* (2013.01); *A61G 7/053* (2013.01); *A61G 7/1044* (2013.01); *A61G 7/104* (2013.01)

(58) Field of Classification Search
CPC .... A61G 7/1038; A61G 7/104; A61G 7/1044; A61G 7/053; Y10S 5/905
USPC .................................... 5/658, 659, 662, 905
See application file for complete search history.

(56) References Cited

U.S. PATENT DOCUMENTS 3,220,024 A * 11/1965 Nelson ................ A61G 7/0507 5/429
5,384,927 A * 1/1995 Mardero ................ A61G 7/053 5/430
5,471,689 A * 12/1995 Shaw ..................... A47C 21/08 5/426
5,640,726 A * 6/1997 Fichner-Rathus ..... A47C 21/08 5/426
5,781,945 A 7/1998 Scherer et al.
6,076,209 A * 6/2000 Paul ..................... A61G 7/0509 5/942
6,138,301 A * 10/2000 Battiston ................ A61G 7/053 5/81.1 R
6,401,280 B1 * 6/2002 Baker .................. A61G 7/0507 5/426
6,578,214 B2 * 6/2003 Peftoulidis ............... A47D 7/00 5/2.1
6,789,280 B1 * 9/2004 Paul ....................... A61G 7/015 5/613
7,775,228 B2 * 8/2010 Clark ....................... A61H 3/02 5/81.1 R
8,458,831 B2 6/2013 Flannery et al.
8,590,080 B1 * 11/2013 Staresinic .............. A47C 21/00 5/430
9,561,146 B2 * 2/2017 Miller .................... A47C 31/00
(Continued)

*Primary Examiner* — Robert G Santos
(74) *Attorney, Agent, or Firm* — Ricky Lam

(57) ABSTRACT

The present invention relates to the technical field of rehabilitation care and medical instruments, and discloses an adjustable bedside assist device, including: a supporting mechanism which is arranged on a bedside and used for supporting and locating the whole device; a handle mechanism which is movably arranged on the supporting mechanism for meeting usage requirements of users at various heights; and a handle adjusting mechanism which is arranged between the handle mechanism and the supporting mechanism and used for controlling and adjusting the handle mechanism at different heights of the supporting mechanism; and the supporting mechanism and the handle mechanism are both height-adjustable mechanisms. The adjustable bedside assist device provided by the present invention can not only meet the usage requirements of the users at different heights, but also effectively meet the requirement of mounting to beds and mattresses of different heights.

16 Claims, 5 Drawing Sheets

(56) References Cited

U.S. PATENT DOCUMENTS

| | | | | |
|---|---|---|---|---|
| 11,564,504 | B2 | 1/2023 | Hover | |
| 2002/0078502 | A1* | 6/2002 | Baker | A61G 7/0518<br>5/425 |
| 2002/0124311 | A1* | 9/2002 | Peftoulidis | A47C 17/86<br>5/400 |
| 2007/0089242 | A1* | 4/2007 | Battiston | A47C 21/08<br>5/425 |
| 2010/0078052 | A1* | 4/2010 | Clark | A61G 7/1038<br>135/65 |
| 2015/0224004 | A1* | 8/2015 | Miller | A61G 7/1038<br>135/65 |
| 2022/0095804 | A1* | 3/2022 | Hover | A47C 21/08 |
| 2024/0148154 | A1 | 5/2024 | Harbar et al. | |
| 2025/0332047 | A1 | 10/2025 | Higgins et al. | |

* cited by examiner

ADJUSTABLE BEDSIDE ASSIST DEVICE

FIELD OF THE INVENTION

The present invention relates to the technical field of rehabilitation care and medical instruments, and specifically relates to an adjustable bedside assist device.

BACKGROUND OF THE INVENTION

As time changes, the trend of population aging in China is becoming increasingly obvious. Because elderly people cannot move quickly and lack strength, they face many difficulties in daily activities. Therefore, the demand for peripheral products for the elderly people increases as the elderly population grows, such as a bedside rail.

The bedside rail is an assist product that is assembled by fixing a horizontal support underneath a mattress and fixing a handle to the edge of a bed. It can be used not only by the elderly people with action difficulties, but also facilitates users who need injury rehabilitation. When the elderly or injured people get in and out of bed, they can use the bedside rail for support to get in or out of the bed, sit up, or lie down. Additionally, when the elderly or injured people take rest in the bed, the bedside rail can provide protection and act as a barrier at the bedside to prevent the elderly or injured people from falling off the bed while turning over.

However, existing bedside rails are generally mounted with a fixed height at the side of the bed, the heights of the handle ends cannot be adjusted to meet the usage requirements of users of different heights and habits, and moreover, the heights of the horizontal supports are also fixed, failing to meet the requirements of mounting to beds and mattresses of different heights.

Therefore, designing a bedside assist technology that can effectively meet the usage requirements of the users of different heights and habits, as well as meet the requirements of mounting in different usage environments, is of a great significance for improving the quality of life of the elderly people and assisting the injured people in rehabilitation training.

SUMMARY OF THE INVENTION

To overcome the shortcomings of the prior art, the present invention provides an adjustable bedside assist device, which integrates a supporting mechanism, a handle mechanism, and a handle adjusting mechanism, the height adjustment of the handle mechanism can be adjusted to meet the usage requirements of users at various heights, and moreover, the supporting mechanism and the handle mechanism are both height-adjustable, thus the usage requirements of the users at various heights can be further effectively met; and furthermore, the height-adjustable supporting mechanism can also effectively meet the requirement of mounting to beds and mattresses of different heights.

The technical effect to be achieved by the present invention is implemented by the followings:

the present invention provides an adjustable bedside assist device, including:

a supporting mechanism which is arranged on the bedside and used for supporting and locating the whole device;

a handle mechanism which is movably arranged on the supporting mechanism for meeting usage requirements of users at various heights; and a handle adjusting mechanism which is arranged between the handle mechanism and the supporting mechanism and used for controlling and adjusting the handle mechanism at different heights of the supporting mechanism; and the supporting mechanism and the handle mechanism are both height-adjustable mechanisms.

As one of the preferred embodiments, the handle mechanism includes:

a handle linkage support which is movably arranged on the supporting mechanism to implement the overall mounting and connection of the mechanism on the supporting mechanism; and a height-adjustable handle assembly which is arranged on the handle linkage support for meeting usage requirements of the users at various heights.

As one of the preferred embodiments, the height-adjustable handle assembly includes:

a handle unit for meeting usage requirements of the users at various heights; and a handle height adjusting unit which is arranged on the handle linkage support and is used for further adjusting the handle unit in a height direction.

As one of the preferred schemes, the handle unit is a telescopic adjustable handle unit and includes:

a first handle support which is arranged on the handle height adjusting unit for meeting usage requirements of the users at various heights;

a second handle support which is movably arranged on the first handle support and is combined with the first handle support to form a protective fence to protect the users; and a handle support adjusting module which is arranged between the first handle support and the second handle support and used for telescopically adjusting the second handle support on the first handle support.

As one of the preferred schemes, the first handle support is sleeved with an anti-slip buffer member for performing slip resistance and buffering during the use of the device.

As one of the preferred schemes, the first handle support and the second handle support are both of a "[-shaped" handle support structure, and open ends of the two handle supports are integrally connected through the handle support adjusting module.

As one of the preferred schemes, the handle height adjusting unit includes a first handle height adjusting unit and a second handle height adjusting unit which are correspondingly arranged on both sides of the handle linkage support.

As one of the preferred embodiments, the first handle height adjusting unit and the second handle height adjusting unit both include:

first handle height adjusting pipes arranged on the top of the handle linkage support;

second handle height adjusting pipes which are connected to the bottom of the handle unit and are movably arranged on the first handle height adjusting pipes; and height adjusting connecting modules which are arranged between the first handle height adjusting pipes and the second handle height adjusting pipes and used for adjusting the second handle height adjusting pipes to different heights on the first handle height adjusting pipes.

As one of the preferred embodiments, the handle adjusting mechanism includes:

a pressing control assembly which is arranged on the handle mechanism and used for controlling the handle mechanism at different heights of the supporting mechanism;

a linkage locking assembly which is connected to the pressing control assembly, arranged between the handle mechanism and the supporting mechanism and used for connecting or disconnecting the handle mechanism to the supporting mechanism under the control of the pressing control assembly.

As one of the preferred embodiments, the pressing control assembly includes a pressing control unit arranged on the handle mechanism, and the pressing control unit includes:

a first pressing control member which is arranged on the handle mechanism and is provided with a first adjusting groove;

a second pressing control member which movably penetrates the first pressing control member and is provided with a second adjusting groove; and a pressing linkage member which is connected to the linkage locking assembly and is arranged between the first adjusting groove and the second adjusting groove; and a pressing end of the second pressing control member extends to the outside the handle mechanism, and can be pressed to drive the pressing linkage member to move so as to realize linkage control over the linkage locking assembly.

As one of the preferred embodiments, the pressing control assembly further includes a pressing assembly housing unit which is connected to the handle mechanism and is arranged on the pressing control unit, and the pressing assembly housing unit includes:

a first pressing assembly housing arranged on the handle mechanism; and a second pressing assembly housing which is connected to the first pressing assembly housing and is arranged on the pressing control unit; and the second pressing assembly housing is provided with a pressing limiting slot for the second pressing control member to movably penetrate through.

As one of the preferred embodiments, the linkage locking assembly includes:

a linkage mounting unit which is arranged at the bottom of the handle mechanism to implement the mounting and limiting of the whole assembly;

an elastic locking unit which movably penetrates the linkage mounting unit and used for movably extending out of the linkage mounting unit and the handle mechanism to be in clamping connection with the supporting mechanism; and a locking adjusting unit of which one end is connected to the pressing control assembly while the other end is connected to the elastic locking unit, the locking adjusting unit being used for performing movable telescopic adjustment on the elastic locking unit under the action linkage of the pressing control assembly.

As one of the preferred embodiments, the linkage mounting unit includes a first linkage mounting sleeve and a second linkage mounting sleeve which are connected to the bottom of the handle mechanism and correspondingly cover the outside of the elastic locking unit and the locking adjusting unit; and one of the first linkage mounting sleeve and the second linkage mounting sleeve is provided with a locking limiting hole for the elastic locking unit to penetrate through.

As one of the preferred embodiments, the elastic locking unit includes:

a locking member which movably penetrates the linkage mounting unit and the handle mechanism and is in clamping connection with the supporting mechanism; and an elastic locking member which is arranged between the locking member and the linkage mounting unit and used for driving the locking member to be in clamping connection with the supporting mechanism.

As one of the preferred embodiments, the locking adjusting unit includes:

a locking limiting rod which penetrates the locking member;

a locking limiting block which abuts against the locking limiting rod and is connected to the locking member, a locking adjusting groove structure being arranged on a side of the locking limiting block abutting against the locking limiting rod;

a locking zipper of which one end is connected to the pressing control assembly while the other end is connected to the locking limiting block, the locking zipper implementing action linkage between the pressing control assembly and the locking limiting block; and a locking reset member which is arranged between the linkage mounting unit and the locking limiting block and used for driving the locking limiting block to reset and maintaining the clamping connection state of the locking member to the supporting mechanism.

As one of the preferred embodiments, the supporting mechanism includes:

height-adjustable supporting assemblies for supporting the whole device; and a device limiting assembly which is connected to the tops of the height-adjustable supporting assemblies, inserted between a bed and a mattress and used for limiting and mounting the whole device.

As one of the preferred embodiments, the device limiting assembly includes:

a device mounting rack which is inserted between the bed and the mattress and used for limiting and mounting the whole device;

mounting rack connecting sleeves which are connected to the device mounting rack, sleeve the tops of the height-adjustable supporting assemblies and are used for performing primary limiting and auxiliary supporting on the device mounting rack; and mounting rack connecting members which are arranged between the mounting rack connecting sleeves and the height-adjustable supporting assemblies in a penetrating mode and used for mounting and completely limiting the device mounting rack.

As one of the preferred schemes, the height-adjustable supporting assemblies include:

supporting rod units for supporting the whole assembly;

a movable supporting unit which is movably arranged on the supporting rod units and used for adjusting the device limiting assembly in a height direction; and supporting height adjusting units which are arranged between the supporting rod units and the movable supporting unit and used for adjusting and controlling the height of the movable supporting unit.

As one of the preferred schemes, the adjustable bedside assist device further includes a sensor light mechanism which is arranged on the supporting mechanism and/or the handle mechanism and used for providing illumination for the users.

As one of the preferred schemes, the sensor light mechanism is an acousto-optic sensor light mechanism or a human body sensor light mechanism or a combined sensor light mechanism integrating acousto-optic sensing and human body sensing.

In conclusion, the present invention has at least the following advantages:

1. The adjustable bedside assist device provided by the present invention integrates the supporting mechanism, the handle mechanism, and the handle adjusting mechanism, and the height of the handle mechanism can be adjusted to meet the usage requirements of the users at various heights can be further effectively met, and moreover, the handle mechanism is the height-adjustable mechanism so that the usage requirements of the users at various heights can be further effectively met.
2. According to the adjustable bedside assist device provided by the present invention, the supporting mechanism is the height-adjustable mechanism so that the requirements of mounting to the beds and mattresses of different heights can be effectively met.
3. The adjustable bedside assist device provided by the present invention further includes the sensor light mechanism which can provide illumination for the users when the light is insufficient, so as to effectively improve and ensure the safety of the users.

REFERENCE NUMERALS

100, handle mechanism; 110, handle linkage support; 111, first linkage pipe; 112, second linkage pipe; 113, support connecting pipe; 120, height-adjustable handle assembly; 121, handle unit; 1211, first handle support; 1212, second handle support; 1213, handle support adjusting module; 1214, anti-slip buffer member; 122, handle height adjusting unit; 122*a*, first handle height adjusting unit; 122*b*, second handle height adjusting unit; 1221, first handle height adjusting pipe; 1222, second handle height adjusting pipe; 1223, height adjusting connecting module;

200, handle adjusting mechanism; 210, pressing control assembly; 211, pressing control unit; 2111, first pressing control member; 2111*a*, first adjusting groove; 2112, second pressing control member; 2112*a*, second adjusting groove; 2113, pressing linkage member; 212, pressing assembly housing unit; 2121, first pressing assembly housing; 2122, second pressing assembly housing; 2122*a*, pressing limiting slot; 220, linkage locking assembly; 221, linkage mounting unit; 2211, first linkage mounting sleeve; 2212, second linkage mounting sleeve; 2212*a*, locking limiting hole; 222, elastic locking unit; 2221, locking member; 2222, elastic locking member; 223, locking adjusting unit; 2231, locking limiting rod; 2232, locking limiting block; 2232*a*, locking adjusting groove structure; 2233, locking zipper; 2234, locking reset member;

300, supporting mechanism; 310, height-adjustable supporting assembly; 311, supporting rod unit; 312, movable supporting unit; 313, supporting height adjusting unit; 320, device limiting assembly; 321, device mounting rack; 322, mounting rack connecting sleeve; 323, mounting rack connecting member; and

400, sensor light mechanism.

DETAILED DESCRIPTION OF SOME EMBODIMENTS

In order to make the objectives, technical solutions, and advantages of the embodiments of the present invention clearer, the technical solutions of the embodiments of the present invention will be clearly and completely described below in conjunction with the drawings of the embodiments of the present invention. The described embodiments are part of the embodiments of the present invention, not all of them.

Therefore, the following detailed description of the embodiments of the present invention provided in the accompanying drawings is not intended to limit the scope of the invention claimed, but merely represents selected embodiments of the invention. All other embodiments obtained by those skilled in the art based on the embodiments of the present invention, without engaging in any inventive work, fall within the scope of the present invention.

Figure 1:
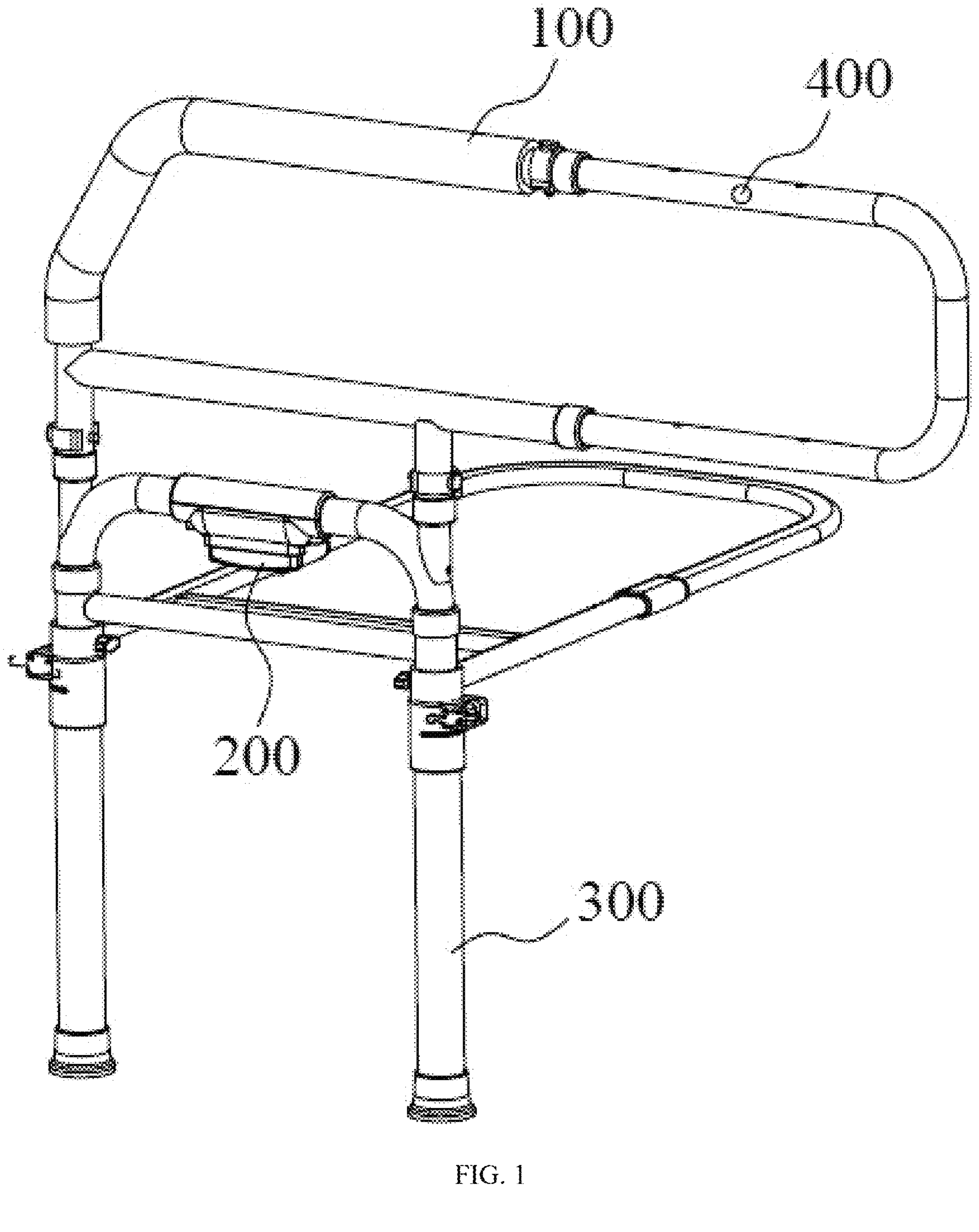
FIG. 1 is an overall schematic structural diagram of an adjustable bedside assist device according to an embodiment of the present invention.

With reference to FIG. 1, an adjustable bedside assist device in this embodiment of the present invention includes a supporting mechanism 300 arranged on a bedside, a handle mechanism 100 movably arranged on the supporting mechanism 300, and a handle adjusting mechanism 200 arranged between the handle mechanism 100 and the supporting mechanism 300; and the supporting mechanism 300 and the handle mechanism 100 are both height-adjustable mechanisms. The supporting mechanism 300 is used for supporting and locating the whole device; the handle mechanism 100 is used for meeting usage requirements of users at various heights as well as meeting the usage requirements of the users with different heights and habits; and the handle adjusting mechanism 200 is used for controlling and adjusting the handle mechanism 100 at different heights of the supporting mechanism 300.

In this embodiment, the adjustable bedside assist device integrates the supporting mechanism 300, the handle mechanism 100, and the handle adjusting mechanism 200, the height adjustment of the handle mechanism 100 can be adjusted to meet the usage needs of the users of different heights, and moreover, the supporting mechanism 300 and the handle mechanism 100 are both height-adjustable, thus the usage requirements of the users at various heights can be further effectively met; and furthermore, the height-adjustable supporting mechanism 300 can also effectively meet the requirements of mounting to beds and mattresses of different heights.

Figure 2:
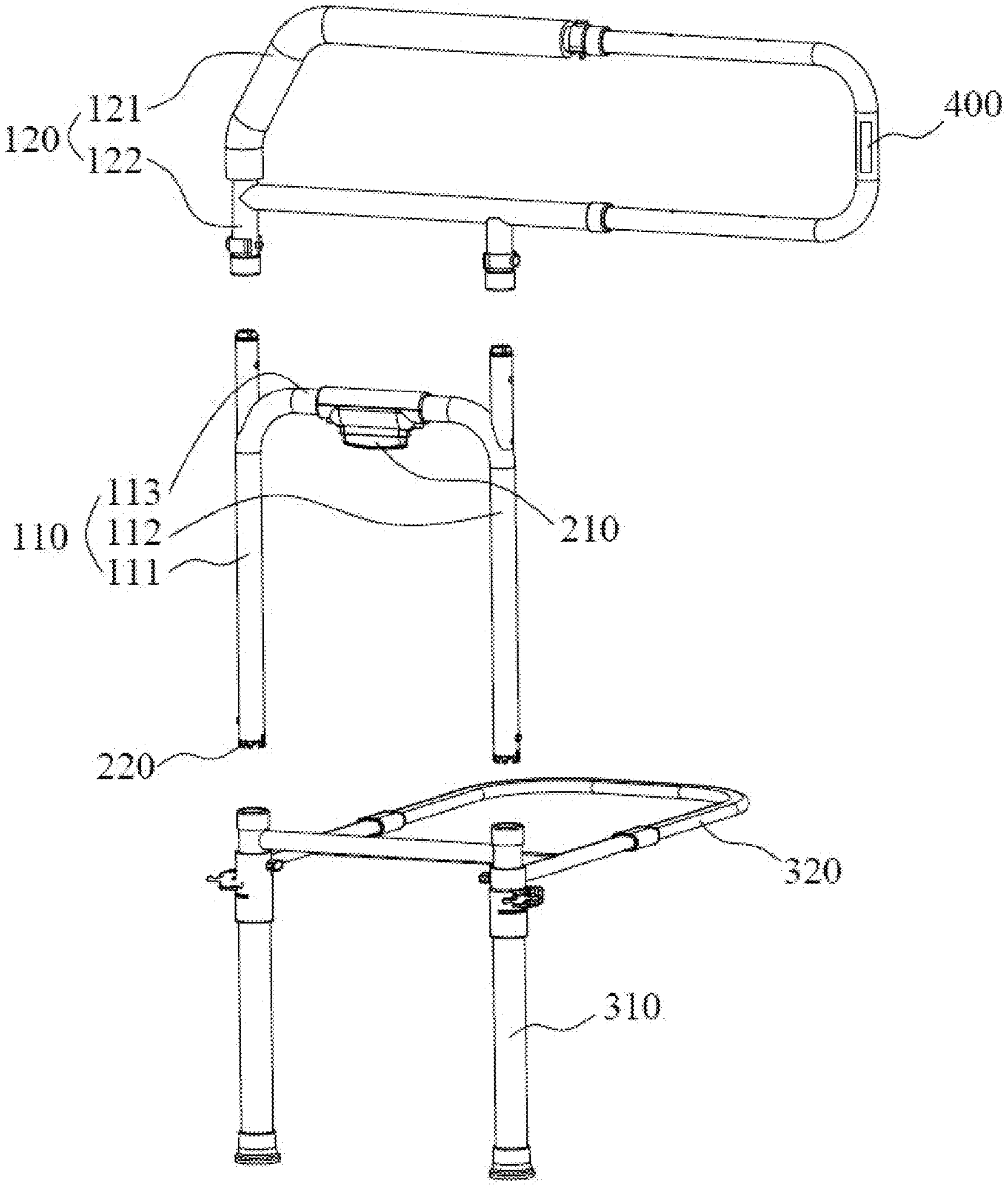
FIG. 2 is an exploded overall schematic structural diagram of an adjustable bedside assist device according to an embodiment of the present invention.

With further reference to FIG. 2, in some embodiments, the handle mechanism 100 includes a handle linkage support 110 which is movably arranged on the supporting mechanism 300 to implement the overall mounting and connection of the mechanism on the supporting mechanism 300; and a height-adjustable handle assembly 120 which is arranged on the handle linkage support 110 for meeting usage requirements of the users at various heights. Preferably, the handle linkage support 110 is of a portal frame structure with a hollow-out interior and includes a first linkage pipe 111, a second linkage pipe 112, and a support connecting pipe 113, in which, the first linkage pipe 111 and the second linkage pipe 112 are movably arranged on the supporting mechanism 300 and used for mounting and connecting the whole support on the supporting mechanism 300, and the support connecting pipe 113 is arranged between the top of the first linkage pipe 111 and the top of the second linkage pipe 112 and used for implementing action linkage and auxiliary supporting of the whole support. Due to the design of the handle linkage support 110 of the portal frame structure, the stability and safety of the whole handle mechanism 100 can be effectively guaranteed, and layout and design of the handle adjusting mechanism 200 can be effectively facilitated.

With further reference to FIG. 2, in some embodiments, the height-adjustable handle assembly 120 includes a handle unit 121 for meeting usage requirements of the users at various heights; and a handle height adjusting unit 122 which is arranged on the handle linkage support 110 and used for further adjusting the handle unit 121 in a height direction.

Figure 3:
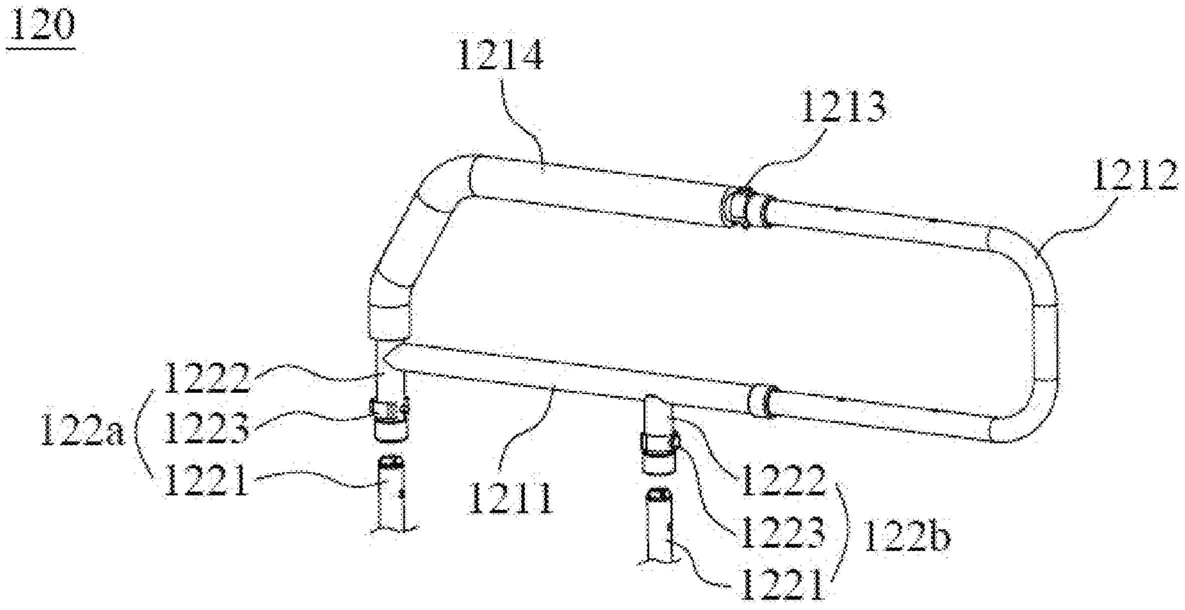
FIG. 3 is a schematic structural diagram of a height-adjustable handle assembly according to an embodiment of the present invention.

In some embodiments, the handle unit 121 is preferably a telescopic adjustable handle unit; with further reference to FIG. 3, the handle unit 121 includes a first handle support 1211 which is arranged on the handle height adjusting unit 122 for meeting usage requirements of the users at various heights; a second handle support 1212 which is movably arranged on the first handle support 1211 and is combined with the first handle support 1211 to form a protective fence to provide protection for the users; and a handle support adjusting module 1213 which is arranged between the first handle support 1211 and the second handle support 1212 and is used for telescopically adjusting the second handle support 1212 on the first handle support 1211.

Further, the first handle support 1211 and the second handle support 1212 are both of a "[-shaped" handle support structure, and open ends of the two handle supports are integrally connected through the handle support adjusting module 1213; the handle support adjusting module 1213 is a screw adjusting module, and a screw penetrates through the first handle support 1211 and the second handle support 1212 to connect the two handles. That is, the open ends of the first handle support 1211 and the second handle support 1212 are integrally connected in a sleeved mode, and the first handle support 1211 and the second handle support 1212 are both provided with threaded holes for screw connection; when the screw is sequentially connected to the threaded holes in the first handle support 1211 and the second handle support 1212, the handle unit 121 can be integrally connected. A plurality of threaded holes can be formed in the first handle support 1211 and the second handle support 1212 to meet the requirement of adjusting the user protection range of the whole handle unit 121.

Further, the first handle support 1211 is sleeved with an anti-slip buffer member 1214 for performing slip resistance and buffering during the use of the device; preferably, the anti-slip buffer member 1214 is buffer foam or a buffer silica gel pad that sleeves the first handle support 1211; and specifically, it can be designed according to actual production and usage requirements.

With further reference to FIG. 3, in some embodiments, the handle height adjusting unit 122 includes a first handle height adjusting unit 122*a* and a second handle height adjusting unit 122*b* which are correspondingly arranged on both sides of the handle linkage support 110; further, the first handle height adjusting unit 122*a* and the second handle height adjusting unit 122*b* both include first handle height adjusting pipes 1221 arranged on the top of the handle linkage support 110; second handle height adjusting pipes 1222 which are connected to the bottom of the handle unit 121 and movably arranged on the first handle height adjusting pipes 1221; and height adjusting connecting modules 1223 which are arranged between the first handle height adjusting pipes 1221 and the second handle height adjusting pipes 1222 and used for adjusting the second handle height adjusting pipes 1222 to different heights on the first handle height adjusting pipes 1221. Preferably, the height adjusting connecting modules 1223 are the same as the handle support adjusting module 1213, and all are screw adjusting modules, and screws sequentially penetrate through the first handle height adjusting pipes 1221 and the second handle height adjusting pipes 1222 which are connected in a sleeving mode to further adjust the height of the handle unit 121.

Figure 4:
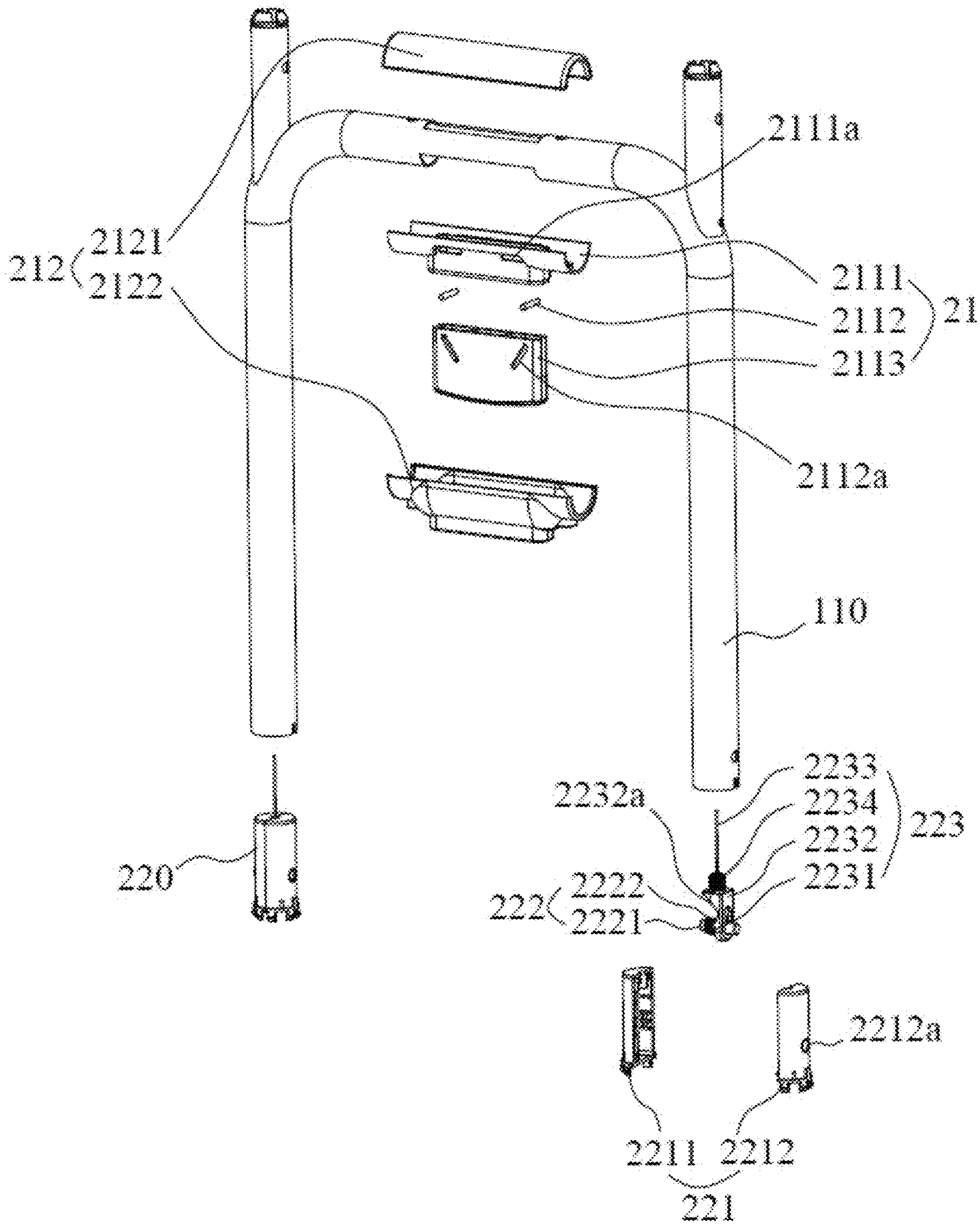
FIG. 4 is an exploded schematic diagram of an assembling structure of a handle linkage support and a handle adjusting mechanism according to an embodiment of the present invention.

With further reference to FIG. 2, in some embodiments, the handle adjusting mechanism 200 includes a pressing control assembly 210 which is arranged on the handle mechanism 100 and used for controlling the handle mechanism 100 at different heights of the supporting mechanism 300; and a linkage locking assembly 220 which is connected to the pressing control assembly 210 and arranged between the handle mechanism 100 and the supporting mechanism 300; the linkage locking assembly 220 is used for connecting and disconnecting the handle mechanism 100 to the supporting mechanism 300 under the control of the pressing control assembly 210. With further reference to FIG. 4, the pressing control assembly 210 includes a pressing control unit 211 which is arranged on the handle linkage support 110 of the handle mechanism 100 and used for adjusting and controlling the height of the handle mechanism 100; and a pressing assembly housing unit 212 which is connected to the handle mechanism 100 and is arranged on the pressing control unit 211. Due to the design of the pressing assembly housing unit 212, the stability of connection between the pressing control unit 211 and the handle mechanism 100 can be effectively improved, and the pressing control unit 211 can be guided and limited to perform control so as to prevent the pressing control unit 211 from being stuck.

With further reference to FIG. 4, in some embodiments, the pressing control unit 211 includes a first pressing control member 2111 which is arranged on the handle mechanism 100 and is provided with a first adjusting groove 2111*a*; a second pressing control member 2112 which movably penetrates the first pressing control member 2111 and is provided with a second adjusting groove 2112*a*; and a pressing linkage member 2113 which is connected to the linkage locking assembly 220 and is arranged between the first adjusting groove 2111*a* and the second adjusting groove 2112*a*; a pressing end of the second pressing control member 2112 extends to the outside the handle mechanism 100, and can be pressed to drive the pressing linkage member 2113 to move so as to realize linkage control over the linkage locking assembly 220. Preferably, the first adjusting groove 2111*a* and the second adjusting groove 2112*a* are each of a long kidney-shaped groove structure, a length direction of the first adjusting groove 2111*a* is parallel to a horizontal direction, and an included angle ranging from 30° to 75° is formed between the length direction of the second adjusting groove 2112*a* and the horizontal direction; when the pressing end of the second pressing control member 2112 is pressed, the pressing linkage member 2113 arranged between the first adjusting groove 2111*a* and the second adjusting groove 2112*a* can reciprocate under the limiting of the two adjusting grooves so that the connected linkage locking assembly 220 can be driven to connect or disconnect the handle mechanism 100 to the supporting mechanism 300.

With further reference to FIG. 4, in some embodiments, the pressing assembly housing unit 212 includes a first pressing assembly housing 2121 arranged on the handle linkage support 110 of the handle mechanism 100; and a second pressing assembly housing 2122 which is connected to the first pressing assembly housing 2121 and arranged on the pressing control unit 211; and the second pressing assembly housing 2122 is provided with a pressing limiting slot 2122*a* for the second pressing control member 2112 to movably penetrate through. Through the design of the pressing limiting slot 2122*a*, the second pressing control member 2112 can be guided and limited to perform movable pressing so as to prevent the pressing control unit 211 from being stuck.

With further reference to FIG. 4, in some embodiments, the linkage locking assembly 220 includes a linkage mounting unit 221 which is arranged at the bottom of the handle mechanism 100 to implement the mounting and limiting of the whole assembly; an elastic locking unit 222 which movably penetrates the linkage mounting unit 221 and is used for movably extending out of the linkage mounting unit 221 and the handle mechanism 100 to be in clamping connection with the supporting mechanism 300; and a locking adjusting unit 223 of which one end is connected to the pressing control assembly 210 while the other end is connected to the elastic locking unit 222, the locking adjusting unit 223 being used for movably telescopically adjusting the elastic locking unit 222 under the action linkage of the pressing control assembly 210. Further, the linkage mounting unit 221 includes a first linkage mounting sleeve 2211 and a second linkage mounting sleeve 2212 which are connected to the bottom of the handle mechanism 100 and cover the outside of the elastic locking unit 222 and the locking adjusting unit 223; and one of the first linkage mounting sleeve 2211 and the second linkage mounting sleeve 2212 is provided with a locking limiting hole 2212*a* for the elastic locking unit 222 to penetrate through.

With further reference to FIG. 4, in some embodiments, the elastic locking unit 222 includes a locking member 2221 which movably penetrates the linkage mounting unit 221 and the handle mechanism 100 and is in clamping connection with the supporting mechanism 300; and an elastic locking member 2222 which is arranged between the locking member 2221 and the linkage mounting unit 221 and used for driving the locking member 2221 to be in clamping connection with the supporting mechanism 300. The locking adjusting unit 223 includes a locking limiting rod 2231 which penetrates the locking member 2221; a locking limiting block 2232 which abuts against the locking limiting rod 2231 and is connected to the locking member 2221; a locking zipper 2233 of which one end is connected to the pressing linkage member 2113 in the pressing control assembly 210 while the other end is connected to the locking limiting block 2232; and a locking reset member 2234 which is arranged between the linkage mounting unit 221 and the locking limiting block 2232.

The locking adjusting groove structure 2232*a* is arranged on a side of the locking limiting block 2232 abutting against the locking limiting rod 2231; the locking limiting rod 2231 can be limited by the locking adjusting groove structure 2232*a* to implement telescopic adjustment of the locking member 2221. Preferably, the locking adjusting groove structure 2232*a* can be designed to be of a U-shaped groove structure or a V-shaped groove structure according to actual requirements. The locking zipper 2233 is used for implementing action linkage between the pressing control assembly 210 and the locking limiting block 2232. Preferably, the locking zipper 2233 is made of a steel wire. The locking reset member 2234 is used for driving the locking limiting block 2232 to reset and maintaining the clamping connection state of the locking member 2221 to the supporting mechanism 300. Further preferably, the locking reset member 2234 and the elastic locking member 2222 are both telescopic springs.

Figure 5:
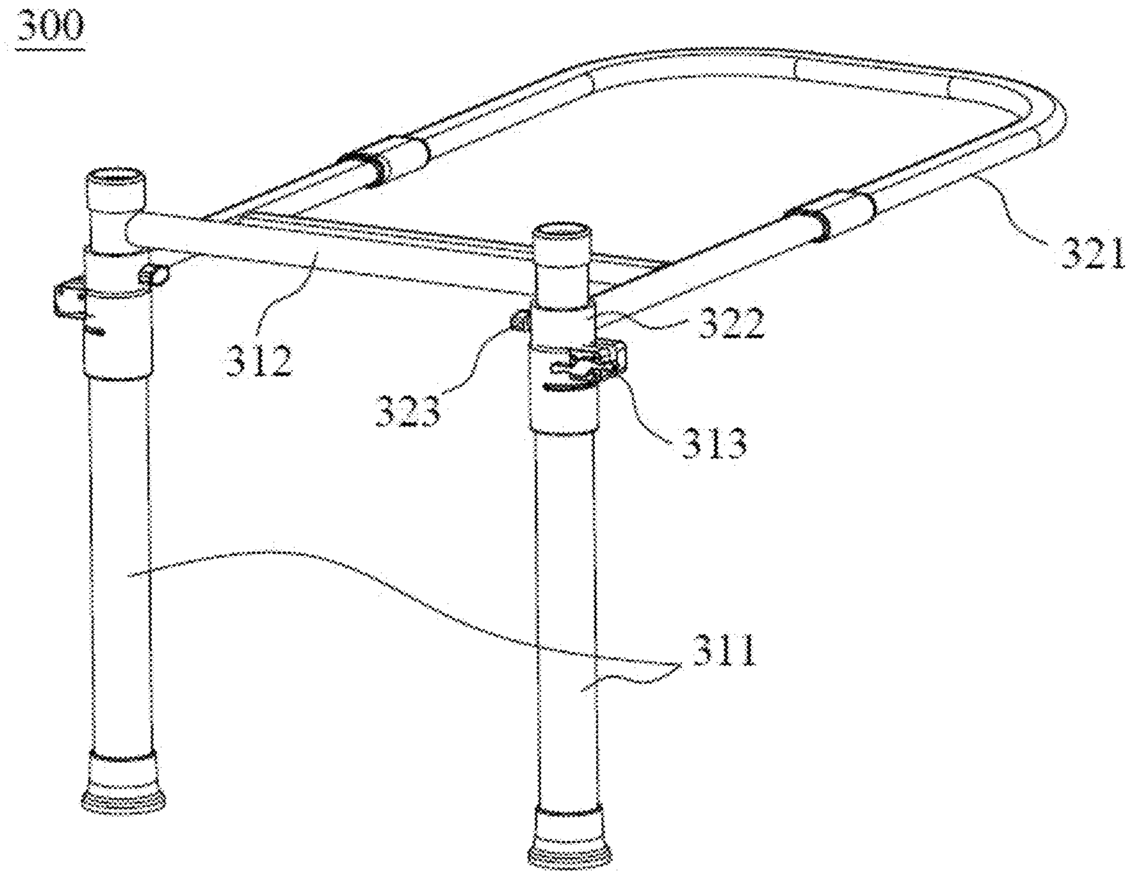
FIG. 5 is a schematic structural diagram of a supporting mechanism according to an embodiment of the present invention.

With further reference to FIG. 5, in some embodiments, the supporting mechanism 300 includes height-adjustable supporting assemblies 310 for supporting the whole device; and a device limiting assembly 320 which is connected to the tops of the height-adjustable supporting assemblies 310 and is inserted between the bed and the mattress. The device limiting assembly 320 is used for limiting and mounting the whole device; further, the device limiting assembly 320 includes a device mounting rack 321 which is inserted between the bed and the mattress and used for limiting and mounting of the whole device; mounting rack connecting sleeves 322 which are connected to the device mounting rack 321, sleeve the tops of the height-adjustable supporting assemblies 310 and are used for performing preliminary limiting and auxiliary supporting on the device mounting rack 321; and mounting rack connecting members 323 which are arranged between the mounting rack connecting sleeves 322 and the height-adjustable supporting assemblies 310 in a penetrating mode and are used for mounting and completely limiting the device mounting rack 321. Preferably, the device mounting rack 321 is a horizontal support in the prior art, and the mounting rack connecting members 323 are connecting screws.

With further reference to FIG. 5, in some embodiments, the height-adjustable supporting assemblies 310 include supporting rod units 311 for supporting the whole assembly; a movable supporting unit 312 which is movably arranged on the supporting rod units 311 and used for adjusting the device limiting assembly 320 in the height direction; and supporting height adjusting units 313 which are arranged between the supporting rod units 311 and the movable supporting unit 312 and used for adjusting and controlling the height of the movable supporting unit 312. Preferably, the movable supporting unit 312 is a gantry-shaped supporting unit, and the supporting height adjusting units 313 are hoop adjusting units.

With further reference to FIG. 1 and FIG. 2, in some embodiments, the adjustable bedside assist device further includes a sensor light mechanism 400 which is arranged on one of or both the supporting mechanism 300 and the handle mechanism 100 and used for providing illumination for the users. Preferably, the sensor light mechanism 400 is an acousto-optic sensor light mechanism or a human body sensor light mechanism or a combined sensor light mechanism integrating an acousto-optic sensing and human body sensing; specifically, the adjustable bedside assist device can be designed according to actual use requirements.

In terms of the technical solutions of the above embodiments, the present invention provides the adjustable bedside assist device, which not only meets the usage requirements of the users at various heights, but also effectively meets the requirements of mounting to the beds and mattresses of different heights. Moreover, it can provide light for the users, so as to effectively improve and ensure the safety of the users.

In the present invention, unless otherwise explicitly specified and limited, the terms "mount", "link", "connect", "fix", and the like should be understood in a broad sense. For example, they may refer to a fixed connection or a detachable connection, or an integral connection; they may be a mechanical connection or an electrical connection; they may be directly linked, or indirectly linked through an intermediate medium; they may refer to internal communication between two components or the interaction between two components. Those of ordinary skill in the art can understand the specific meanings of these terms in the context of the present invention based on the specific circumstances.

In the description of the present invention, it is to be noted that the terms "center", "upper", "lower", "left", "right", "vertical", "horizontal", "inside", "outside", and the like, which indicate orientation or positional relationships, are based on the orientation or positional relationships shown in the accompanying drawings, or on the customary orientation or positional relationships when the product of the present invention is in use. These are solely for the convenience of describing the present invention and simplifying the description, and do not indicate or imply that the referred devices or components must have a specific orientation, be constructed in a specific orientation, or operate in a specific orientation. Therefore, they should not be construed as limiting the present invention. In addition, the terms "first", "second", "third", etc., are used merely for distinction in description, and should not be understood to indicate or imply relative importance.

In addition, terms such as "horizontal", "vertical", and "suspended" do not imply that the components must be perfectly horizontal or suspended; they can be slightly tilted. For example, "horizontal" only indicates that its orientation is more horizontal relative to "vertical", and does not mean that the structure must be completely level; a slight tilt is acceptable.

In the present invention, unless otherwise explicitly stated and defined, the first feature being above or below the second feature may include the first and second features being in direct contact, or the first and second features not being in direct contact but in contact through another feature between them. Moreover, the first feature being above, over, or on top of the second feature includes the first feature being directly above or diagonally above the second feature, or simply indicates that the first feature has a higher horizontal level than the second feature. The first feature being below, under, or beneath the second feature includes the first feature being directly below or diagonally below the second feature, or simply indicates that the first feature has a lower horizontal level than the second feature.

Although the description of the present invention is made in conjunction with the above specific embodiments, those skilled in the art will be able to make many substitutions, modifications, and changes based on the above content, which are obvious. Therefore, all such alternatives, improvements, and variations are included within the spirit and scope of the appended claims.

What is claimed is:

1. An adjustable bedside assist device, comprising:

a supporting mechanism (300) which is arranged on a bedside and used for supporting and locating the whole device;

a handle mechanism (100) which is movably arranged on the supporting mechanism (300) for meeting usage requirements of users at various heights; and a handle adjusting mechanism (200) which is arranged between the handle mechanism (100) and the supporting mechanism (300) and used for controlling and adjusting the handle mechanism (100) at different heights of the supporting mechanism (300); and the supporting mechanism (300) and the handle mechanism (100) are both height-adjustable mechanisms;

wherein the handle mechanism (100) comprises:

a handle linkage support (110) which is movably arranged on the supporting mechanism (300) to implement the overall mounting and connection of the mechanism on the supporting mechanism (300); and a height-adjustable handle assembly (120) which is arranged on the handle linkage support (110) for meeting usage requirements of the users at various heights;

wherein the height-adjustable handle assembly (120) comprises:

a handle unit (121) for meeting usage requirements of the users at various heights; and a handle height adjusting unit (122) which is arranged on the handle linkage support (110) and used for further adjusting the handle unit (121) in a height direction;

wherein the handle height adjusting unit (122) comprises a first handle height adjusting unit (122*a*) and a second handle height adjusting unit (122*b*) which are correspondingly arranged on both sides of the handle linkage support (110);

wherein the first handle height adjusting unit (122*a*) and the second handle height adjusting unit (122*b*) both comprise:

first handle height adjusting pipes (1221) arranged on the top of the handle linkage support (110);

second handle height adjusting pipes (1222) which are connected to the bottom of the handle unit (121) and are movably arranged on the first handle height adjusting pipes (1221); and height adjusting connecting modules (1223) which are arranged between the first handle height adjusting pipes (1221) and the second handle height adjusting pipes (1222) and used for adjusting the second handle height adjusting pipes (1222) to different heights on the first handle height adjusting pipes (1221).

2. The adjustable bedside assist device according to claim 1, wherein the handle unit (121) is a telescopic adjustable handle unit and comprises:

a first handle support (1211) which is arranged on the handle height adjusting unit (122) for meeting usage requirements of the users at various heights;

a second handle support (1212) which is movably arranged on the first handle support (1211) and is combined with the first handle support (1211) to form a protective fence to protect the users; and a handle support adjusting module (1213) which is arranged between the first handle support (1211) and the second handle support (1212) and used for telescopically adjusting the second handle support (1212) on the first handle support (1211).

3. The adjustable bedside assist device according to claim 2, wherein the first handle support (1211) is sleeved with an anti-slip buffer member (1214) for performing slip resistance and buffering during the use of the device.

4. The adjustable bedside assist device according to claim 2, wherein the first handle support (1211) and the second handle support (1212) are both of a "[-shaped" handle support structure, and open ends of the two handle supports are integrally connected through the handle support adjusting module (1213).

5. The adjustable bedside assist device according to claim 1, wherein the handle adjusting mechanism (200) comprises:

a pressing control assembly (210) which is arranged on the handle mechanism (100) and used for controlling the handle mechanism (100) at different heights of the supporting mechanism (300); and a linkage locking assembly (220) which is connected to the pressing control assembly (210), arranged between the handle mechanism (100) and the supporting mechanism (300) and used for connecting or disconnecting the handle mechanism (100) to the supporting mechanism (300) under the control of the pressing control assembly (210).

6. The adjustable bedside assist device according to claim 5, wherein the pressing control assembly (210) comprises a pressing control unit (211) arranged on the handle mechanism (100), and the pressing control unit (211) comprises:

a first pressing control member (2111) which is arranged on the handle mechanism (100) and is provided with a first adjusting groove (2111*a*);

a second pressing control member (2112) which movably penetrates the first pressing control member (2111) and is provided with a second adjusting groove (2112*a*); and a pressing linkage member (2113) which is connected to the linkage locking assembly (220) and is arranged between the first adjusting groove (2111*a*) and the second adjusting groove (2112*a*);

a pressing end of the second pressing control member (2112) extends to the outside the handle mechanism (100), and can be pressed to drive the pressing linkage member (2113) to move so as to realize linkage control over the linkage locking assembly (220).

7. The adjustable bedside assist device according to claim 6, wherein the pressing control assembly (210) further comprises a pressing assembly housing unit (212) which is connected to the handle mechanism (100) and is arranged on the pressing control unit (211), and the pressing assembly housing unit (212) comprises:

a first pressing assembly housing (2121) arranged on the handle mechanism (100); and a second pressing assembly housing (2122) which is connected to the first pressing assembly housing (2121) and is arranged on the pressing control unit (211); and the second pressing assembly housing (2122) is provided with a pressing limiting slot (2122*a*) for the second pressing control member (2112) to movably penetrate through.

8. The adjustable bedside assist device according to claim 5, wherein the linkage locking assembly (220) comprises:

a linkage mounting unit (221) which is arranged at the bottom of the handle mechanism (100) to implement the overall mounting and limiting of the assembly;

an elastic locking unit (222) which movably penetrates the linkage mounting unit (221) and is used for movably extending out of the linkage mounting unit (221) and the handle mechanism (100) to be in clamping connection with the supporting mechanism (300); and a locking adjusting unit (223) of which one end is connected to the pressing control assembly (210) while the other end is connected to the elastic locking unit (222), the locking adjusting unit being used for performing movable telescopic adjustment on the elastic locking unit (222) under the action linkage of the pressing control assembly (210).

9. The adjustable bedside assist device according to claim 8, wherein the linkage mounting unit (221) comprises a first linkage mounting sleeve (2211) and a second linkage mounting sleeve (2212) which are connected to the bottom of the handle mechanism (100) and correspondingly cover the outside of the elastic locking unit (222) and the locking adjusting unit (223); and one of the first linkage mounting sleeve (2211) and the second linkage mounting sleeve (2212) is provided with a locking limiting hole (2212*a*) for the elastic locking unit (222) to penetrate through.

10. The adjustable bedside assist device according to claim 8, wherein the elastic locking unit (222) comprises:

a locking member (2221) which is movably arranged on the linkage mounting unit (221) and the handle mechanism (100) in a penetrating manner and is in clamping connection with the supporting mechanism (300); and an elastic locking member (2222) which is arranged between the locking member (2221) and the linkage mounting unit (221) and used for driving the locking member (2221) to be in clamping connection with the supporting mechanism (300).

11. The adjustable bedside assist device according to claim 10, wherein the locking adjusting unit (223) comprises:

a locking limiting rod (2231) which penetrates the locking member (2221);

a locking limiting block (2232) which abuts against the locking limiting rod (2231) and is connected to the locking member (2221), a locking adjusting groove structure (2232*a*) being arranged on a side of the locking limiting block (2232) abutting against the locking limiting rod (2231);

a locking zipper (2233) of which one end is connected to the pressing control assembly (210) while the other end is connected to the locking limiting block (2232), the locking zipper implementing action linkage between the pressing control assembly (210) and the locking limiting block (2232); and a locking reset member (2234) which is arranged between the linkage mounting unit (221) and the locking limiting block (2232) and used for driving the locking limiting block (2232) to reset and maintaining the clamping connection state of the locking member (2221) to the supporting mechanism (300).

12. The adjustable bedside assist device according to claim 1, wherein the supporting mechanism (300) comprises:

height-adjustable supporting assemblies (310) for supporting the whole device; and a device limiting assembly (320) which is connected to the tops of the height-adjustable supporting assemblies (310), inserted between a bed and a mattress and used for limiting and mounting the whole device.

13. The adjustable bedside assist device according to claim 12, wherein the device limiting assembly (320) comprises:

a device mounting rack (321) which is inserted between the bed and the mattress and used for limiting and mounting the whole device;

mounting rack connecting sleeves (322) which are connected to the device mounting rack (321), sleeve the tops of the height-adjustable supporting assemblies (310) and are used for performing primary limiting and auxiliary supporting on the device mounting rack (321); and mounting rack connecting members (323) which are arranged between the mounting rack connecting sleeves (322) and the height-adjustable supporting assemblies (310) in a penetrating mode and are used for mounting and completely limiting the device mounting rack (321).

14. The adjustable bedside assist device according to claim 12, wherein the height-adjustable supporting assemblies (310) comprise:

supporting rod units (311) for supporting the whole assembly;

a movable supporting unit (312) which is movably arranged on the supporting rod units (311) and used for adjusting the device limiting assembly (320) in a height direction; and supporting height adjusting units (313) which are arranged between the supporting rod units (311) and the movable supporting unit (312) and used for adjusting and controlling the height of the movable supporting unit (312).

15. The adjustable bedside assist device according to claim 1, wherein further comprising a sensor light mechanism (400) which is arranged on the supporting mechanism (300) and/or the handle mechanism (100) and used for providing illumination for the users.

16. The adjustable bedside assist device according to claim 15, wherein the sensor light mechanism (400) is an acousto-optic sensor light mechanism or a human body sensor light mechanism or a combined sensor light mechanism integrating acousto-optic sensing and human body sensing.

* * * * *